No. 784,393. PATENTED MAR. 7, 1905.
G. GRABOSCH.
COMMUTATOR.
APPLICATION FILED JULY 30, 1904.
5 SHEETS—SHEET 1.
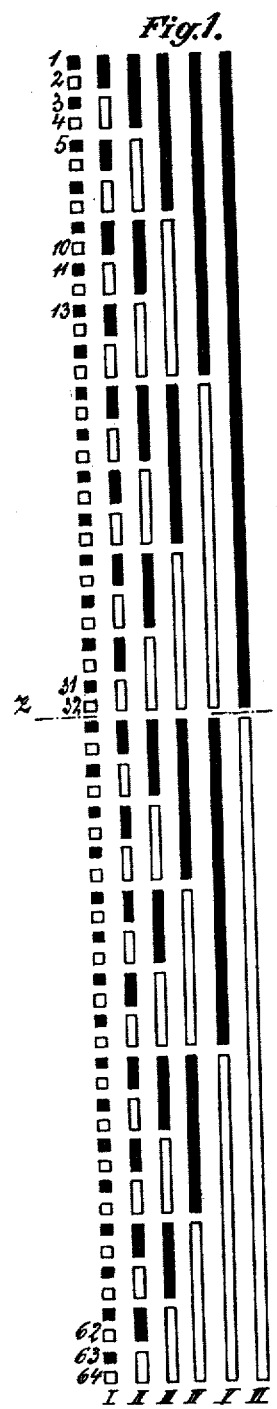
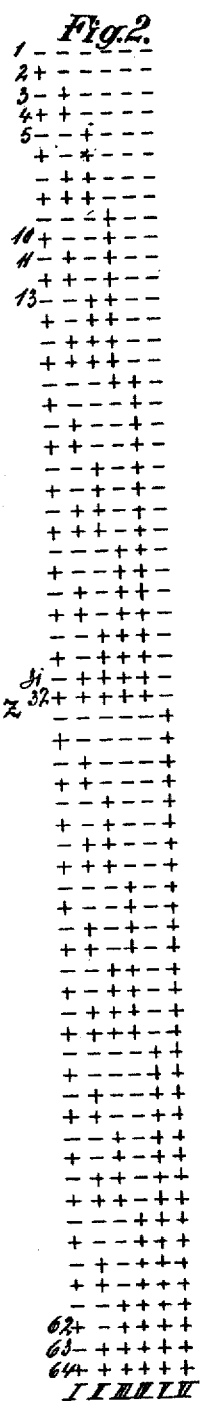
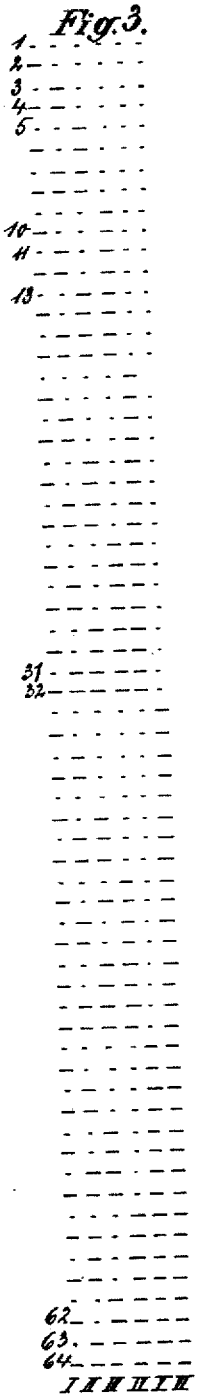
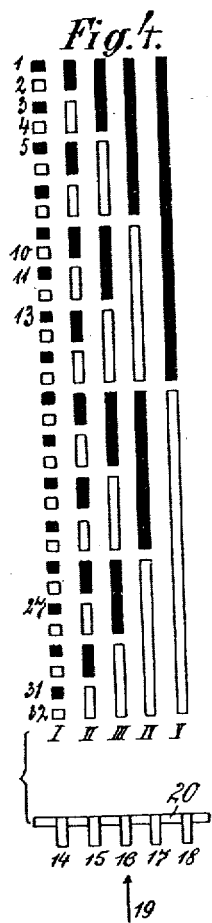
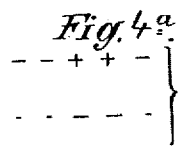
Witnesses:
James B Mansfield
L. E. Witham
Inventor:
Gustav Grabosch
By: Alexander & Dowell
Attorneys No. 784,393. PATENTED MAR. 7, 1905.
G. GRABOSCH.
COMMUTATOR.
APPLICATION FILED JULY 30, 1904.

5 SHEETS—SHEET 2.

Witnesses:
James R. Mansfield
L. E. Witham

Inventor:
Gustav Grabosch
By Alexander & Lowell
Attorneys

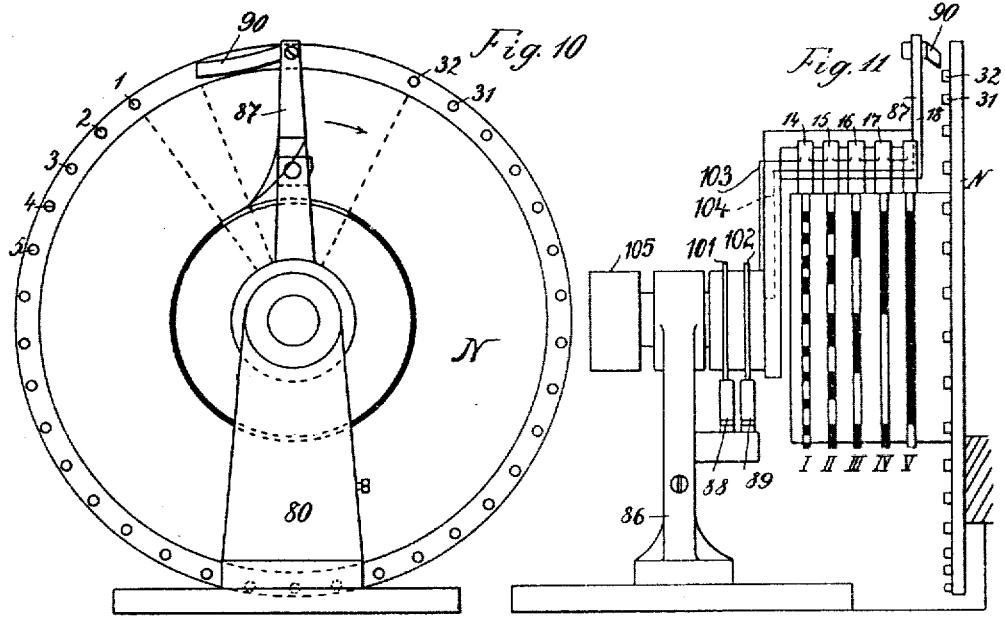

No. 784,393. PATENTED MAR. 7, 1905.
G. GRABOSCH.
COMMUTATOR.
APPLICATION FILED JULY 30, 1904.
5 SHEETS—SHEET 4.
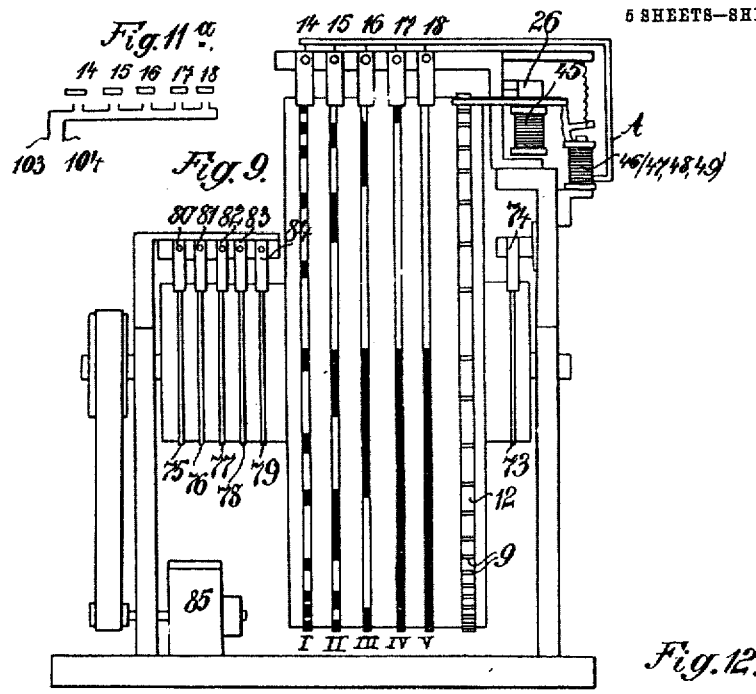
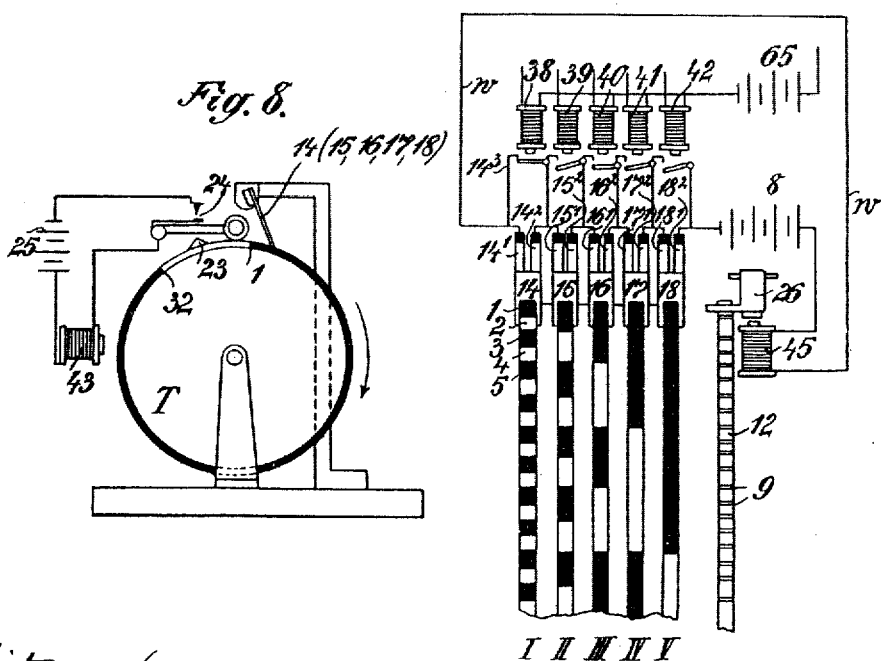
Witnesses:
James P. Mansfield
L. E. Witham
Inventor:
Gustav Grabosch
By:
Alexander & Dowell
Attorneys.

No. 784,393. PATENTED MAR. 7, 1905.
G. GRABOSCH.
COMMUTATOR.
APPLICATION FILED JULY 30, 1904.
6 SHEETS—SHEET 5.
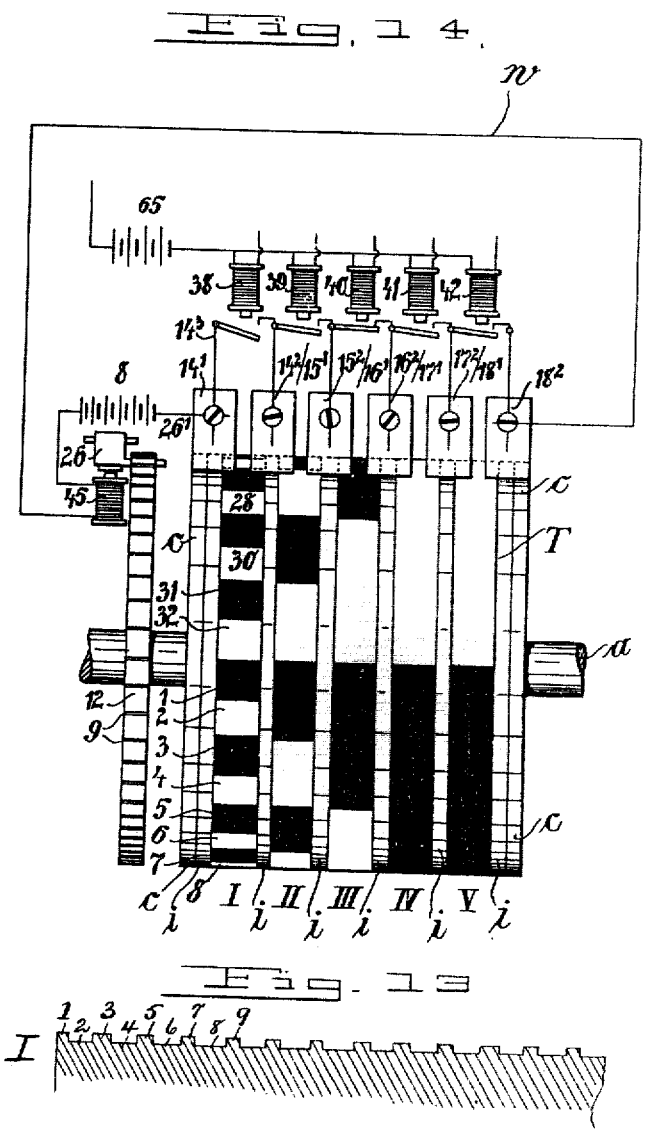

No. 784,393.

Patented March 7, 1905.

UNITED STATES PATENT OFFICE.

GUSTAV GRABOSCH, OF BERLIN, GERMANY.

COMMUTATOR.

SPECIFICATION forming part of Letters Patent No. 784,393, dated March 7, 1905.

Application filed July 30, 1904. Serial No. 218,917.

*To all whom it may concern:*

Be it known that I, GUSTAV GRABOSCH, a subject of the King of Prussia, German Emperor, residing at Berlin, in the Kingdom of Prussia, German Empire, have invented certain new and useful Improvements in Commutators, of which the following is a full, clear, and exact description.

This invention relates to improvements in apparatus for transmitting electric signals or impulses by employing short and long or positive and negative impulses. According to the selected combination a specified point of the circumference of a drum or moving part will be held or arrested in the desired place, or the desired circuits may be established for purposes of telegraphy, telephony, or for transmitting any other signals.

The invention will be clearly understood from the following description in connection with the accompanying drawings.

The features for which protection is desired are set forth in the claims.

Figure 5:
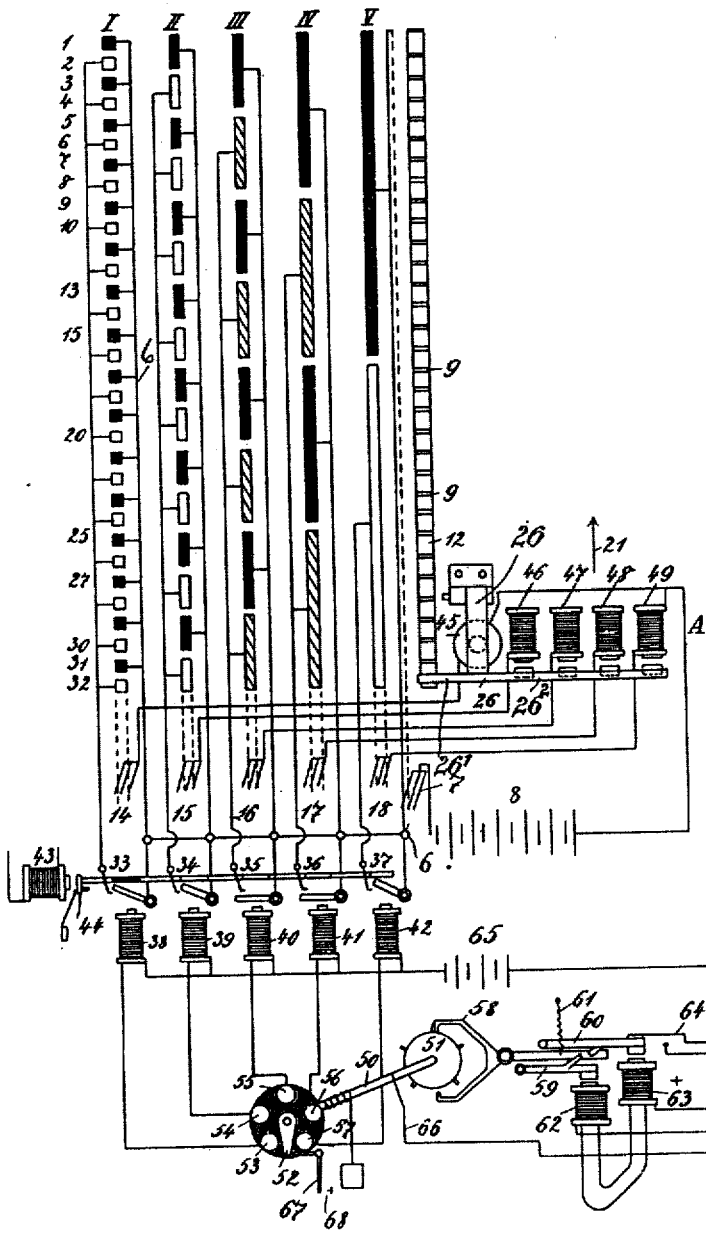
Figure 6:
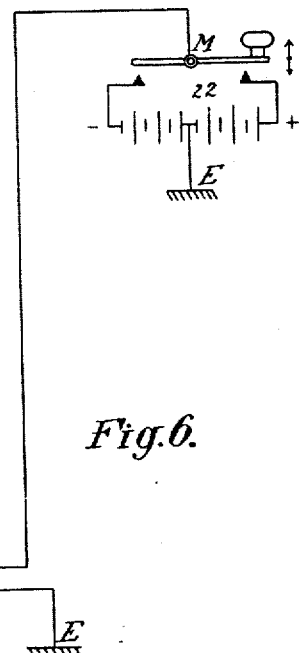

In the drawings, Figure 1 is a diagrammatical view showing the relative arrangement of the fields or series of contacts. Figs. 2 and 3 are similar views indicating the different characters of signs or impulses which can be produced by the contacts in Fig. 1. Fig. 4 is a diagram of a set of fields and a coacting set of contacts. Fig. 4ᵃ is a detail showing certain transmitting-signals. Figs. 5 and 6 are diagrams which together form a complete transmitting apparatus embodying the invention. Fig. 7 is a diagram of a transmitting device which can be substituted for that shown in Fig. 6. Fig. 8 is a detail diagram of a cutting-out device. Fig. 9 shows a modification of the apparatus. Figs. 10 and 11 are side and front views of another modification thereof. Fig. 11ᵃ is a detail of Fig. 11. Fig. 12 shows another arrangement or modification. Fig. 13 is a detail side elevation of a field, showing the alternate depressions and projections. Fig. 14 is a side view of the preferred specific construction of transmitting apparatus.

In the accompanying drawings the two different quantities or powers are marked by black and white spaces or fields, each containing a series of electrical contacts and arranged in parallel, as indicated, I, II, III, IV, V, and VI in the drawings. Row I of Fig. 1 contains sixty-four spaces, row II of Fig. 1 only half the number of spaces—viz., thirty-two—each space of row II covering two spaces of row I. Row III shows sixteen, row IV eight, row V four, row VI two spaces, each row thus containing half the number of spaces of the preceding and double the number of spaces of the following row, each space covering two spaces of the preceding row. This diagram, called a "series of powers," ends thus with the sixth row, as its two spaces can only represent, like two spaces of row I, two different powers or quantities. Figs. 2 and 3 contain sixty-four signs in each row. It is easily understood that if the diagram of Fig. 1 would end at 32 or would be divided in two at this point, as indicated at line Z Z, the two last powers or quantities differing from each other would be found in row V. If positive and negative impulses as two different powers are connected with the series of Fig. 1—the black spaces representing the negative or minus and the white the positive or plus impulses—the first horizontal row shows six black or minus spaces, the horizontal row 2 a white space in row I and five black ones in row II to VI. Horizontal row 3 contains a black space in row I, a white space in row II, and four black ones in row III to VI. In horizontal row 4 the spaces succeed each other—white in rows I and II, black in rows III to VI, &c.—as can be easily seen in Fig. 1, the last horizontal row 64 containing six white or positive spaces or fields. As the white spaces refer to plus and the black ones to minus impulses, they can be replaced by the signs themselves, thus giving the diagram Fig. 2. In this the first vertical row I contains alternately plus and minus, while the other rows agree in the same way with Fig. 1. For instance, the horizontal row 32 is equal to five plus and one minus spaces and row 64 to six plus spaces. If it is intended to use only one kind of impulse, the two different quantities are represented by different length of time, (like the Morse signs.) The minus may then be replaced by the dot and the plus by the dash, as is shown in Fig. 3. In this the horizontal row 1, for instance, contains six dots; row 10, dash, dot, dot, dash, dot, dot; row 32, five dashes and one dot; row 64, six dashes. The diagram of Fig. 3 agrees, therefore, perfectly with the diagram of Figs. 1 and 2. It is therefore easy to understand that the signs shown in Figs. 2 and 3 can be read without difficulty from left to right and that all horizontal rows from 1 to 64 in the diagram of Figs. 2 and 3 have different signs and that none of these signs occurs more than once in the diagram. Each row 1 to 64 being represented by a particular signal, it is merely necessary to transmit them by suitable apparatus or other means to obtain the desired effect by joining up the signals. This effect may be obtained, for instance, by printing one of the sixty-four signs or by circuiting one of sixty-four wires or the like. Such apparatus is shown in Figs. 4, 5, and 6. For sake of greater clearness a series of powers with only thirty-two horizontal rows or signs is shown in Fig. 4 containing five vertical rows I to V. There are two ways of connecting the spaces which are shown in Fig. 4 in black and white into suitable apparatus in a practical manner. In the first case the five rows of the series are arranged on a plate, the black spaces and stripes being higher than the white ones as shown in Fig. 13. The black spaces represent, therefore, a higher level than the white ones. In this case some or all of the springs 14, 15, 16, 17, and 18 of a carrier 20, moving in the direction of the arrow 19 over the vertical rows I II III IV V will vibrate, the vibrations depending on the springs passing over the higher or the lower level of the rows I to V—viz., over an elevation or a recess. In the second case the spaces arranged in rows are electrically separated from each other, the black spaces being electrically connected among themselves and with a current-generator. The white spaces of each row are also connected with each other electrically and can (each row separately) be supplied by a conductor with current. Fig. 5 shows this device. If the five springs 14 15 16 17 18 (see Fig. 4) only effect the desired operation when all five springs are in an elevated position, they will not assume such a position until they are brought opposite the first horizontal row of contacts by being moved in the direction of the arrow 19. The printing or connecting apparatus is, however, only influenced when all springs are elevated. If any of the five is depressed, no action can take place. Such mechanical arrangements have been already made by Baudot and others and are supposed to be well known. If the operation that takes place when the springs are brought opposite the first horizontal row is to be repeated or obtained when the springs reach row 13, it would suffice to elevate those two springs mechanically or electrically that are normally depressed at 13. These are the springs 16 and 17 of the vertical rows III and IV. If they are raised before the carrier 20 has begun to move, the first release takes place at 13 and the second time at 5, as observation will show. Thus it is clear that several places exist where a release can take place. This repeated release would, however, make the apparatus useless if it could not be cut out of the circuit after the first release. The proper position for releasing each of the rows 1 to 32 is found by always beginning at row 32 and then moving the carrier upward till the release has taken place, whereupon the apparatus is cut out of the circuit till the carrier 20 has returned to the position shown in Fig. 4. Now row 31, Fig. 4, shows an elevation in row I and four depressions in rows II, III, IV, and V corresponding with the springs 15, 16, 17, and 18 of the carrier 20. If the springs 15, 16, 17, and 18 be elevated, the carrier 20 would release at 31, which is really the case as the depressed spring 14 meets at 32 a lower-level space of row I, and thus prevents a release till the depressed spring 14 arrives at the high-level space 31. Here the carrier 20 is released and the apparatus cut out of the circuit by known mechanical or electrical devices. How the springs 14, 15, 16, 17, and 18 have to be grouped for each signal is shown by following the diagram of Fig. 4 from left to right. The white spaces of the vertical rows I, II, III, IV, and V agree with those springs 14, 15, 16, 17, and 18 that have to be raised before for the purpose of releasing the carrier 20 in the desired place. If the carrier were to be released at 27, the springs 15, 17, and 18 would have to be elevated. For a release at the horizontal row 13, for instance, the springs 16 and 17 would have to be raised; for 11, springs 15 and 17; for 5, spring 16, and for 3, spring 15. As before mentioned, the movement of the carrier 20 must begin for each signal at the lower end of the rows I to V and stop in that horizontal row where the release takes place, thus preventing a repetition of the release during the same movement of the carrier. Heretofore it was assumed that the elevations and recesses shown in the diagram of Fig. 4 were fixed and that carrier 20 with the five releasing-springs moved in a straight line across it. The elevations and recesses may be also arranged on the circumference of a drum, in which case either the carrier 20 or the drum may be revolved. Instead of the elevations and recesses shown in Fig. 4 insulated strips of copper may be used, with which brushes contact. Fig. 5 shows such a device. In the vertical rows I, II, III, IV, and V the black spaces are connected by wire 6 and brush 7 with one pole of the battery 8 and the white spaces by the contacting catches 33, 34, 35, 36, and 37 and the electromagnets 38, 39, 40, 41, and 42 with the circuit of the battery 65. The electromagnet 43 or its armature 44 can cut the white spaces out of the circuit. The electromagnet 43 attracts the armature 44, thus pushing the contacting catches 33 34 35 36 37 to the left, whereupon the armatures of the electromagnets 38 to 42 are released or lowered, if they had been raised before, like the armatures of magnets 38 39 42 in Figs. 5 and 6. The attraction of the armature of the magnets 38, 39, 40, 41, and 42, Fig. 5, has the same effect as the raising of the springs 14, 15, 16, 17, and 18 of Fig. 4. The release of the springs 14, 15, 16, 17, and 18 is replaced in Fig. 5 by an arresting device A, that engages the space 9 between two teeth of a rack 12, and thus arrests the brushes in the desired position by an extension of an armature 26 of the magnet 45. As shown in Fig. 5, the armature 26 of the magnet 45 has two extensions. One, 26', reaches to the rack 12. The other, 26", extends to the right and carries the armatures of the electromagnets 46, 47, 48, and 49. The other armatures are arranged in such manner that they arrest the movement of the armature 26 till magnets 46, 47, 48, and 49 are actuated. The coils of magnets 45, 46, 47, 48, and 49 are connected, on the one hand, to battery 8 and, on the other hand, to the brushes 14, 15, 16, 17, and 18. If the brushes are to be arrested at the horizontal row 13, the armature belonging to the catches 35 and 36 must be attracted by their magnets 40 and 41, Fig. 5, this agreeing with the raising of the springs 16 and 17 in Figs. 4 and 4ª. In this position of the brushes all spaces or fields of the vertical rows III and IV, Fig. 5, are circuited by the brush 7 with one of the poles of the battery 8. It is difficult to show the above circuits clearly, as the brushes 14, 15, 16, 17, 18, and 7 are passing over the horizontal row 13 when the circuits are closed. According to Fig. 5 the thirteenth horizontal row is the only row where all contact-spaces are supplied with current. In any other position no current passes through them. The segments or fields circuited by the magnets 41 and 42 are shown hatched. If the device A be now moved in the direction of the arrow 21, the brushes 14, 15, 16, 17, and 18 contact with the segments or spaces on the vertical rows I, II, III, IV, and V, while the brush 7 passes the current directly into the black spaces and indirectly into the hatched spaces by the contacting catches 35 and 36. These circuits could not be very clearly shown; but it is only necessary to imagine the brushes 14, 18, and 7 contacting with the horizontal row 13. In all other positions there will be at least one brush out of contact. When the brushes 14, 15, 16, 17, and 18 pass over segments with current, the corresponding magnets 45, 46, 47, 48, and 49 will attract their armature and finally arrest the carrier by causing the armature 26 to engage the rack. This cannot occur before all magnets attract their armatures at once—i. e., in the assumed position at 13. In all preceding rows there would be at least one segment without current. While in the drawings only a limited number of rows of contacts or fields are shown, it is obvious that an even greater number of such fields may be used, and thereby the number of individual signals capable of transmission by the apparatus be multiplied to any desired extent. The methods for actuating the armatures of the magnets 38, 39, 40, 41, and 42 of Fig. 5, (analogous to the raising of springs 14, 15, 16, 17, and 18,) from a distance with a single line are already known, but cannot be omitted if the apparatus described herein is to be understood.

Both alternating or inverse currents of different length (Morse) may be employed. A device for the use of inverse or alternating currents is shown in Fig. 6. 50 is an axle in perspective to which is fixed an escape-wheel 51 (with five teeth) on one side and an arm 52 for closing the current on the other. The arm 52 glides over the contacts 53, 54, 55, 56, and 57, that are arranged on a disk of insulating material. The axle 50 may be rotated with its arm 52 by any suitable means—for instance, by a weight fixed to a cord that is wound round the axle. The rotation begins the moment the lever 58 releases the escape-wheel 51, the lever 58 being swung by the armatures 59 and 60 or their extension. 61 is an antagonistic spring. A polarized-magnet system acts by means of coils 62 and 63 attracting their armatures 59 and 60, magnet 62 only working under the influence of negative and magnet 63 of positive impulses. Magnet 63 also closes the contact 64. If magnet 62 is only energized, the escape-wheel 51 is released, allowing the axle to rotate. If magnet 63, however, is energized, a current can pass by the contact 64 to the contacts 53 to 57 besides. M of Fig. 5 is a transmitter of a distant station. As an example it may consist of a key and a battery 22, that is connected to the key by its poles and to earth in the middle. The transmitter can send impulse in inverse directions into the line. Battery 65 is connected on the one hand to contact 64 and on the other to magnets 38, 39, 40, 41 and 42. From the poles of each of these magnets a wire leads to the contact-pieces 53, 54, 55, 56, and 57. If the circuit is closed by the arm 52 sliding over the contact 53, the contact-spring 66, sliding on axle 50, passes the current from the battery 65 to the magnet 38. If contact 64 is, however, not closed, the arm 52 slides over the contact 53 without passing a current, and magnet 38 is not energized. Thus signal No. 13, Fig. 4ª, adjusts magnets 40 and 41 by energizing them.

The device A, together with the brushes 14 to 18 and 7, is moved by any suitable mechanism (not shown) which is preferably operated or controlled electrically. When the brushes arrive at the point where current is found in all fields, the device A stops automatically and must be returned to its original position of rest before beginning another operative stroke. The mechanism for operating the device A is controlled electrically by closing a circuit between the lever 67 and contact 68. These contacts are shown in Figs. 5 and 7; but the particular mechanism for operating the device A is not shown, as it forms no part of the present invention.

If magnets 38, 39, 40, 41, and 42 are to be adjusted by currents of different length, (Morse,) the device shown in Fig. 7 is used, which is identical with that of Fig. 6, with the exception of the magnetic system. The transmitter of the distant station consists in this case, however, of a Morse key M and a battery 23, that is connected to earth with one of its poles. The lines lead through the two magnets 69 and 70 to the ground E. The magnet 70 for the dots attracts its armature, forming one arm of the lever 58. The armature for the magnet 69 (for the dashes) is provided with an extension 71 for closing the contact 64 on the one hand. On the other hand, extension 71 is connected with an arresting device 72 (which may consist of a wing-regulator) in such a manner that the contact 64 can only be closed when magnet 69 receives a current during a longer space of time, corresponding to the length of the dashes of the Morse alphabet. If currents, therefore, pass through the line and the two magnets 70 and 69, the magnet 70 will release the escape-wheel 51 in any case, whether the impulse has the length of a dot or a dash; but if the impulse only lasts the time corresponding to a dot contact 64 will not be closed, and arm 52 slides over the contacts 53–57 without any current passing. Should the impulse possess the length of a dash, the magnet 70 will first attract its armature 58, thus causing the contact-arm 52 to rest on the corresponding contact 53–57 till the arresting device 72 allows of a closing of contact 64 by magnet 69. When the current for the dash has ceased passing, both magnets release their armatures, and a further impulse of a length of a dot can only attract the armature 58 of the magnet 70. The local battery 65 thus adjusts the magnets 38, 39, 40, 41, and 42 in much the same manner as in Fig. 6. If Fig. 7 takes the place of Fig. 6, the apparatus acts in the same manner as described above. Figs. 6 and 7 may be, therefore, exchanged without causing any material difference in the function of the apparatus.

Fig. 9 shows another arrangement of Fig. 5, with a side view of the rotatory apparatus. The vertical rows of fields or segments I, II, III, IV, and V are fixed on a drum, together with the toothed disk 12, which engages the armature 26 of magnet 45. Fig. 9 only shows magnet 46, as the magnets 47 48 49, Fig. 5, that lie in a line behind 46, are invisible. The same applies to the armatures of said magnets. The copper segments or fields of the rows I, II, III, IV, and V, that are constantly joined up to the battery 8, are shown in Fig. 9 in black. The current passes into them by the commutator 73, on which brush 74 slides, that is always connected with one pole of battery 8. The segments of the vertical rows I, II, III, IV, and V that are to be supplied with current if signals are to be given are connected with the collecting-rings 75, 76, 77, 78, and 79, with which the brushes 80, 81, 82, 83, and 84 contact. These brushes are connected with 33, 34, 35, 36, and 37 of the diagram of Fig. 5. The brushes 14 15 16 17 of Fig. 9 have the same purpose as those of Fig. 5 and are connected in the same way with the magnets 45 46 47 48 49. The outer switching devices, by which the magnets 38, 39, 40, 41, and 42, Fig. 5, are actuated, have been omitted in Fig. 9, as it is not intended to show a particular form of commutator. A motor 85 rotates the commutator.

Fig. 12 shows another kind of apparatus for releasing the springs 14, 15, 16, 17, and 18, Fig. 4, that is characterized by requiring but one arresting-magnet 45, the armature 26 of which engages the rack 12, as described above. The vertical rows I, II, III, IV, and V are again provided with elevations and recesses, like in the diagram of Fig. 4. As each of the movable springs 14, 15, 16, 17, and 18 closes in this commutator two contact-springs $14'$ $14^2$, $15'$ $15^2$, $16'$ $16^2$, $17'$ $17^2$, $18'$ $18^2$, all these contact-springs are connected with each other when the springs 14, 15, 16, 17, and 18 have been elevated. The contact-springs $14'$ $14^2$ $15'$ $15^2$ $16'$ $16^2$ $17'$ $17^2$ $18'$ $18^2$ are connected by wires with the armature of the magnets 38, 39, 40, 41, and 42, by which these armatures may be short-circuited. The short-circuiting of a pair of contact-springs $15'$ $15^2$, &c., by the armature of one of the magnets 38 to 41 has the same effect as the raising of one of the springs 14, 15, 16, 17, and 18, because the raising of a spring short-circuits only one pair of springs $14'$ $15'$ $16^2$, &c. The diagram of Fig. 12 shows this clearly. It also shows that the magnet 45 is excited by the current from battery 8 if all contact-springs $14'$ $14^2$, &c., are short-circuited. The magnets 38, 39, 40, 41, and 42 of Fig. 12 are actuated in the same manner as those shown in Figs. 6 and 7. The adjustment that is shown in Fig. 12 corresponds to the row or point 2 of the circumference of the drum and to the same row of the diagram of Fig. 4 that shows but one white space or field in row I. For horizontal row 2 the magnet 38, Fig. 12, must therefore attract its armature, thus short-circuiting the pair of springs $14'$ $14^2$, the current from battery 8 then passing through $18^2$, 18, $18'$, $17^2$, 17, $17'$, $16^2$, 16, $16'$, $15^2$, 15, $15'$, armature of magnet 38, the wires $14^3$ $w$, to magnet 45. The diagram Fig. 12 also shows that the magnet 45 will not stop the drum till this has arrived at 2, even if the rows I, II, III, IV, and V began with number 19. This agrees perfectly with the adjustment of signal 2 by exciting the magnet 38.

A modification of the device shown in Fig. 12 may be obtained by making the elevations of the vertical rows I, II, III, IV, and V of some conducting material, (see Fig. 14,) which elevated spaces must be, however, insulated from each other. The contact - springs $14'$ $14^2$ $15'$ $15^2$ $16'$ $16^2$ $17'$ $17^2$ $18'$ $18^2$ would then slide direct on the elevated spaces of rows I, II, III, IV, and V and are short-circuited by the latter. By this arrangement the springs 14 15 16 17 18 may be omitted, the contacting of springs $14'$ $14^2$ with the vertical conducting elevations of row I, of springs $15'$ $15^2$ with elevations of row II, &c., replacing the action of the springs 14, 15, 16, 17, and 18. Each of the pairs of springs $14^2$ and $15'$, $15^2$ and $16'$, $16^2$ and $17'$, $17^2$ and $18'$ may be replaced with advantage by a single contact-spring, as each pair is connected to the same wire, only the contact-springs $14'$ and $18^2$ having a wire line of their own. The vertical rows I, II, III, IV, and V, &c., may be mounted on a drum. Such arrangement of commutator is shown in Fig. 14. The drum T revolves on its axle $a$ and is provided with five rows I, II, III, IV, and V, or a series of powers or contacts agreeing with the diagram Fig. 4. Each of the rows I, II, III, IV, and V consists of a cylinder, and are insulated from each other and from the contact-disks $c\ c$ by disks $i$. On the axle $a$ is mounted a disk 12, the circumference of which is toothed or indented to form signal-spaces 9. This disk acts in the same manner as the rack 12 in Figs. 5 and 12 by engaging the extension $26'$ of the armature 26, that is attracted by the electromagnet 45. The six contact-springs $14'$, $14^2$, $15'$, $15^2$, $16'$, $16^2$, $17'$, $17^2$, $18'$, and $18^2$ rub on the corresponding vertical rows on the contact-disks $c\ c$ and are short-circuited in passing over the elevated spaces, while the circuits are interrupted as they pass over the recesses. The device shown in Fig. 14 can be combined either with the device shown in Fig. 6, if positive and negative impulses are employed, or with the device shown in Fig. 7, if short and long impulses are used. In this construction, as in all others where a drum is used, it is not necessary that all thirty-two horizontal rows are fixed in the drum. If fewer signals are required—for instance, twenty-eight—some of the first or the last rows may be omitted.

It still remains to be shown how the magnet 43 is actuated that puts the adjusted contact-catches 33, 34, 35, 36, and 37 out of gear after the apparatus has been used and has to be prepared for further use. Fig. 8 shows a device which may be used for this purpose. The black part of its circumference 1 to 32 of the drum moving in the direction of the arrow contains the series of powers according to the diagram of Fig. 4. When the drum is revolved, springs 14, 15, 16, 17, and 18 first touch the highest number 32 of the series of powers moving in the direction of row number 1. On the circumference of the drum T between 1 and 32 there is a projection 23, that closes the contact 24 by means of a trolley. Battery 25 can then excite the magnet 43, which cuts the contact-catches out of the circuit when the springs 14, 15, 16, 17, and 18 have passed 32 and before they reach number 1, as is clearly shown in Fig. 5. Figs. 10, 11, and $11^a$ show a device that may be used, especially if the apparatus is to be connected to several different circuits. For this purpose a number of contacts corresponding with the number of positions of the apparatus—for instance, thirty-two—are arranged on the fixed disk N. In the middle of the disk N there is a device consisting of elevations and recesses like those shown in the diagram of Fig. 4, fixed on the convex surface of a cylinder. Contrary to the arrangement of Fig. 9 the drum is immovable and the arm 87 rotates round its axle in the plumber-block 86, Figs. 10 and 11. Arm 87 carries the springs 14, 15, 16, 17, and 18, that each close two contacts. The diagram of Fig. $11^a$ shows an arrangement of the contacts, the action of which has been described in Fig. 11. The local current-wires 103 and 104, Fig. $11^a$, lead to two collecting-rings 101 and 102 and two collecting-brushes 88 and 89. Into the lines 103 and 104 must be inserted a magnet 45 to arrest the arm 87. The contact-springs 14, 15, 16, 17, and 18 and the two contact-springs 88 and 89 are insulated, while the contact-spring 90 at the upper end of the rotating arm 87 is connected by its axle with the metal frame. Assuming the arm 87 be rotated in the direction of the arrow by a pulley 105, the spring 90 glides over the contacts 32 31 30, &c., to 1. Supposing the contacts 32 31, &c., be joined up to relay-lines that command other circuits, it is easily understood that by a suitable adjustment in the direction of the selected combination of impulses any of the relay-circuits 1 to 32 may be closed continually. The magnet 45, Fig. 12, intended to adjust the apparatus by arresting it may in this case, too, close a particular local circuit for the purpose of adjusting the relays.

What I claim as my invention, and desire to secure by Letters Patent, is—

1. In an electrical transmitting apparatus, a transmitter having parallel rows of contacts, the first of said rows containing as many contacts as there are signals to be given, the second row containing half as many contacts as the first row, the third row having half the number of the second row and so on, each contact of a subsequent row being double the length of a contact in the preceding row, substantially as and for the purpose set forth.

2. In an electrical transmitting apparatus, a transmitter having parallel rows of contacts, the first of said rows containing as many contacts as there are signals to be given, the second row containing half as many contacts as the first row, the third row having half the number of the second row and so on, each contact of a subsequent row being double the length of a contact in the preceding row, in combination with a selecting device carrying a contact for each row on the transmitter, said selector and transmitter being relatively movable, substantially as described.

3. In combination, a series of rows of contacts, the first of said rows containing as many contacts as there are different signals to be given, the second row containing half the number of contacts of the first row, the third row half the number of the second row and so on, the last row containing but two contacts, each contact of a later row being double the length of a contact of the next previous row, the contacts in each row being alternately on a high and a low level, and a number of devices corresponding to the rows of contacts and adapted to close a circuit therethrough, substantially as and for the purpose set forth.

4. An electric signal-selecting apparatus consisting of conductive contacts insulated from each other and arranged in rows, the first of said rows containing as many contacts as there are different signals to be given, the second row containing half the number of contacts as the first row, the third row half the number of the second row, and so on, each contact of a later row being double the length of a field of a previous row, and the contacts in such row being alternately connected with each other and to a source of electricity; and a number of sliding contacts one for each row, adapted to close the circuits, substantially as and for the purpose set forth.

5. In an apparatus for electric signaling by combining different kinds of electric impulses, a series of insulated rows of contacts, the first of said rows containing as many contacts as there are different signals to be transmitted, the second row containing half the number of contacts of the first row, the third row half the number of the second row, and so on, the contacts of each row being alternately connected with each other and in combination with a series of relatively movable contacts, one for each row and means for transmitting electrical impulses through the respective contacts, substantially as and for the purpose set forth.

6. In an apparatus for transmitting electrical signals or signs by combining positive and negative impulses, a series of rows of insulated contacts, the first row containing as many contacts as there are signals to be transmitted, the second row containing half the number of contacts of the first row, the third row half the number of the second row, and so on, the last row containing but two contacts, the contacts in each row being alternately connected by a wire with each other with a sliding contact 7 and with a source of electricity 8; a corresponding number of sliding contacts 14, 15, 16, 17, 18, and electromagnets 45, 46, 47, 48, 49, with a common armature 26, a rack 12, a transmitter-battery 22 and key, two electromagnets, 62, 63, a forked lever 58, an escape-wheel 51 and a contact-arm 52 on a common axle 50, means for rotating said axle, a disk with contacts 53-57 an electromagnet 38-42 with armature for each row I-V, a local battery 65, catches 33-37 for said armature and an electromagnet 43, with armature 44, substantially as and for the purpose set forth.

7. In an apparatus for transmitting signs or signals by electric currents, a transmitting-surface containing a series of rows of contacts, each succeeding row containing half as many contacts as the next preceding row; with a circuit-closing device adapted to simultaneously make contact with transversely-alined contacts in the rows, and means for adjusting said device so that it will close the contacts at predetermined points on the transmitter, substantially as described.

8. In an apparatus for transmitting signs or signals by electric currents, a transmitting-surface containing a series of rows of contacts, the alternate contacts in each row being of opposite polarity, and each succeeding row containing half as many contacts as the next preceding row; with a circuit-closing device adapted to simultaneously make contact with the transversely-alined contacts in the rows, and means for adjusting said device so that it will close the contacts at predetermined points on the transmitting-surface, substantially as set forth.

9. In an electrical transmitter having parallel rows of circuit-controlling spaces, the second of such rows having half as many spaces as the first row, the third row having half as many spaces as the second row, and so on, substantially as set forth.

10. In an electrical transmitter having parallel rows of circuit-controlling spaces, the second of such rows having half as many spaces as the first row, the third row having half as many spaces as the second row, and so on, the spaces in each subsequent row being double the length of the spaces in the next preceding row, substantially as and for the purpose described.

11. In an electrical transmitting apparatus, a transmitter having parallel rows of circuit-controlling spaces, the second of such rows having half as many spaces as the first row, the third row having half as many spaces as the second row, and so on; in combination with a selecting device for each row, the transmitter and selecting devices being relatively movable, substantially as described.

12. In an electrical transmitting apparatus, e combination of a transmitter having parallel rows of circuit-controlling spaces, the second of such rows having half as many spaces as the first row, the third row having half as many spaces as the second row, and so on, the spaces in each subsequent row being double the length of the spaces in the next preceding row; with a selecting device for each row, said devices being arranged in line, the transmitter and selecting devices being relatively movable, substantially as described.

13. In an apparatus for transmitting signs or signals by electric currents, a transmitting-surface containing a series of rows of circuit-controlling spaces, each succeeding row containing half as many spaces as the next preceding row; with circuit-closing devices adapted to simultaneously coact with transversely-alined spaces in the rows, and means for adjusting said devices so that the circuits are closed at predetermined points on the transmitter, substantially as described.

14. An apparatus for transmitting different kinds of electric impulses, comprising parallel rows of contacts; each subsequent row containing but half as many contacts as the preceding row, and the contacts in each row being separated by depressions; with means adapted to short-circuit adjacent rows of contacts.

15. In combination, a series of parallel conductive fields each containing a series of contacts insulated from each other and arranged on a drum, the first of said fields having as many contacts as there are different signals to be transmitted, the second field containing half as many contacts as the first field, the third field half as many as the second field, and so on, each contact in a later field being double the length of the contact in the next previous field, the contacts in each field being separated by depression, a corresponding number of pairs of sliding springs electrically connected with a battery, means for controlling said springs and means for transmitting the impulses from said springs to their respective fields, substantially as and for the purpose set forth.

16. In combination, conductive fields, each composed of a series of contacts insulated from each other, said fields being arranged on a drum in parallel, the first of said fields containing a number of contacts equal to the different signals to be transmitted, the second field containing half the number of contacts as the first, the third field half as many contacts as the second, and so on, the contacts in each field being separated by depression, a contact-disk at each end of the drum, a corresponding number of contact-springs $14'$, $14^2$, $15'$, $15^2$, $16'$, $16^2$, $17'$, $17^2$, and $18'$, $18^2$ electrically connected with a battery, and means for transmitting the impulses from the contacts to their respective fields, substantially as and for the purpose set forth.

In witness whereof I subscribe my signature in presence of two witnesses.

GUSTAV GRABOSCH.

Witnesses:
HENRY HASPER,
FRANK H. MASON.